United States Patent [19]
Holley

[11] Patent Number: 5,155,375
[45] Date of Patent: Oct. 13, 1992

[54] SPEED CONTROL SYSTEM FOR A VARIABLE SPEED WIND TURBINE

[75] Inventor: William E. Holley, Pleasanton, Calif.

[73] Assignee: U.S. Windpower, Inc., Livermore, Calif.

[21] Appl. No.: 762,924

[22] Filed: Sep. 19, 1991

[51] Int. Cl.⁵ .................... H02P 9/00; F03D 7/00
[52] U.S. Cl. .............................. 290/44; 290/55
[58] Field of Search .................... 290/44, 55

[56] References Cited

U.S. PATENT DOCUMENTS

| | | | |
|---|---|---|---|
| 4,193,005 | 3/1983 | Kos et al. | 290/44 |
| 4,410,806 | 10/1983 | Brulle | 290/44 |
| 4,426,192 | 1/1984 | Chertok et al. | 416/1 |
| 4,474,531 | 10/1984 | Weiss | 416/11 |
| 4,490,093 | 12/1984 | Chertok et al. | 416/26 |
| 4,525,633 | 6/1985 | Wertheim et al. | 290/44 |
| 4,613,762 | 9/1986 | Soderholm | 290/44 |
| 4,651,017 | 3/1987 | Longrigg | 290/44 |
| 4,695,736 | 9/1987 | Doman et al. | 290/44 |
| 4,700,081 | 10/1987 | Kos et al. | 290/44 |
| 4,703,189 | 10/1987 | DiValentin et al. | 290/44 |
| 4,816,696 | 3/1989 | Sakayori et al. | 290/52 |
| 5,083,039 | 1/1992 | Richardson et al. | 290/44 |

OTHER PUBLICATIONS

Hinrichsen, E. N., "Variable Rotor Speed for Wind Turbines: Objectives and Issues", AP-4261, Research Project 1996-9, Final Report, Sep. 1985, Research Reports Center, Palo, Alto, Calif.

Holley, et al., "Optimal Quasistatic Control of Variable Speed Wind Turbines," European Wind Energy Conference and Exhibition, Jul. 10-13, 1989 (EWEC '89) pp. 341-344.

McNerney et al., "The Effect of a Power Electronic Converter on Power Fluctuation and Harmonic Distortion in a WECS," ASME Wind Energy Symposium, New Orleans, Jan., 1990.

Marechal et al., "Variable Speed Optimal Control of a Windgenerator", European Wind Energy Association Conference and Exhibition, Oct. 7-9, 1986, Rome, Italy.

Matsuzaka et al., "A Variable Speed Wind Generating System and its Test Results," Hachinohe Institute of Technology, Tohoku Electric Power Company, Japan.

Smith et al., "A Variable-Speed Constant-Frequency Induction Generator for Sub and Supersynchronous Operation," European Wind Energy Association Conference and Exhibition, Oct. 7-9, 1986, Rome, Italy.

Primary Examiner—A. D. Pellinen
Assistant Examiner—Robert Lloyd Hoover
Attorney, Agent, or Firm—Blakely, Sokologg, Taylor & Zafman

[57] ABSTRACT

A controller and method is disclosed for operating a variable speed turbine to better track wind speed fluctuations for greater efficiency in conversion of wind energy to electrical energy. The controller of the invention controls the rotor speed in accordance with a wind speed supplied by a wind observer in order to approximately follow the varying wind speeds. The wind observer predicts the average wind speed at a subsequent point in time over the cross-section presented to the wind by the wind turbine. The average wind speed is applied to a parameter schedule to determine desired values for rotor speed and torque which are used by a rotor speed stabilizer to command a reference load torque. The load torque of the generator is controlled in accordance with the commanded load torque, and therefore the desired rotor speed is approximated. During operation, the wind speed prediction process is repeated at each subsequent time interval, and the load torque, and therefore rotor speed, is controlled accordingly. The wind observer calculates the aerodynamic torque and then calculates net torque. The wind speed is predicted as a function of the present (previously predicted) wind speed and correction terms including net torque and the difference between the predicted and actual rotor speed. The wind observer is useful whenever the wind turbine rotor is turning, whether or not it is producing power.

66 Claims, 8 Drawing Sheets

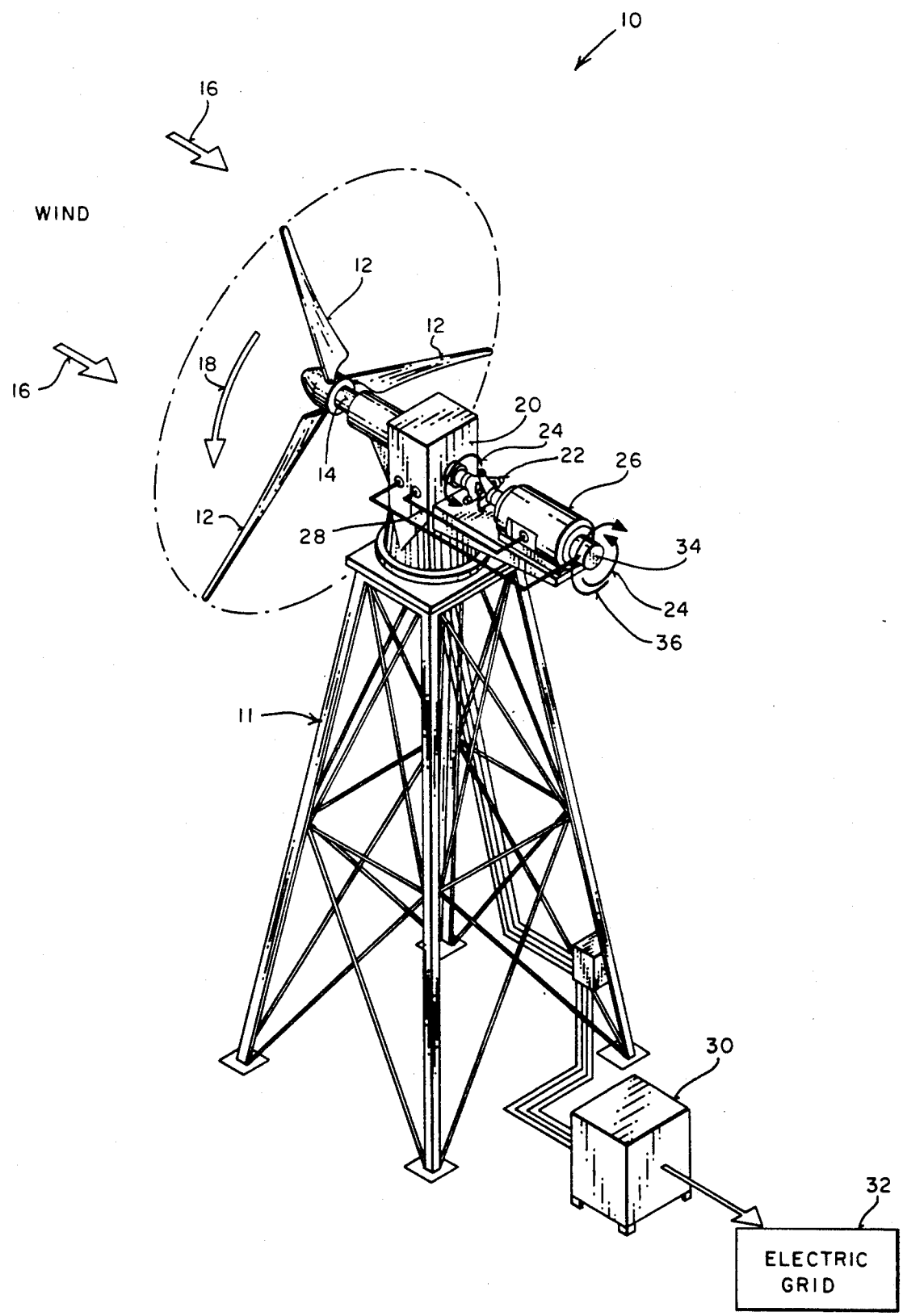
FIG_1

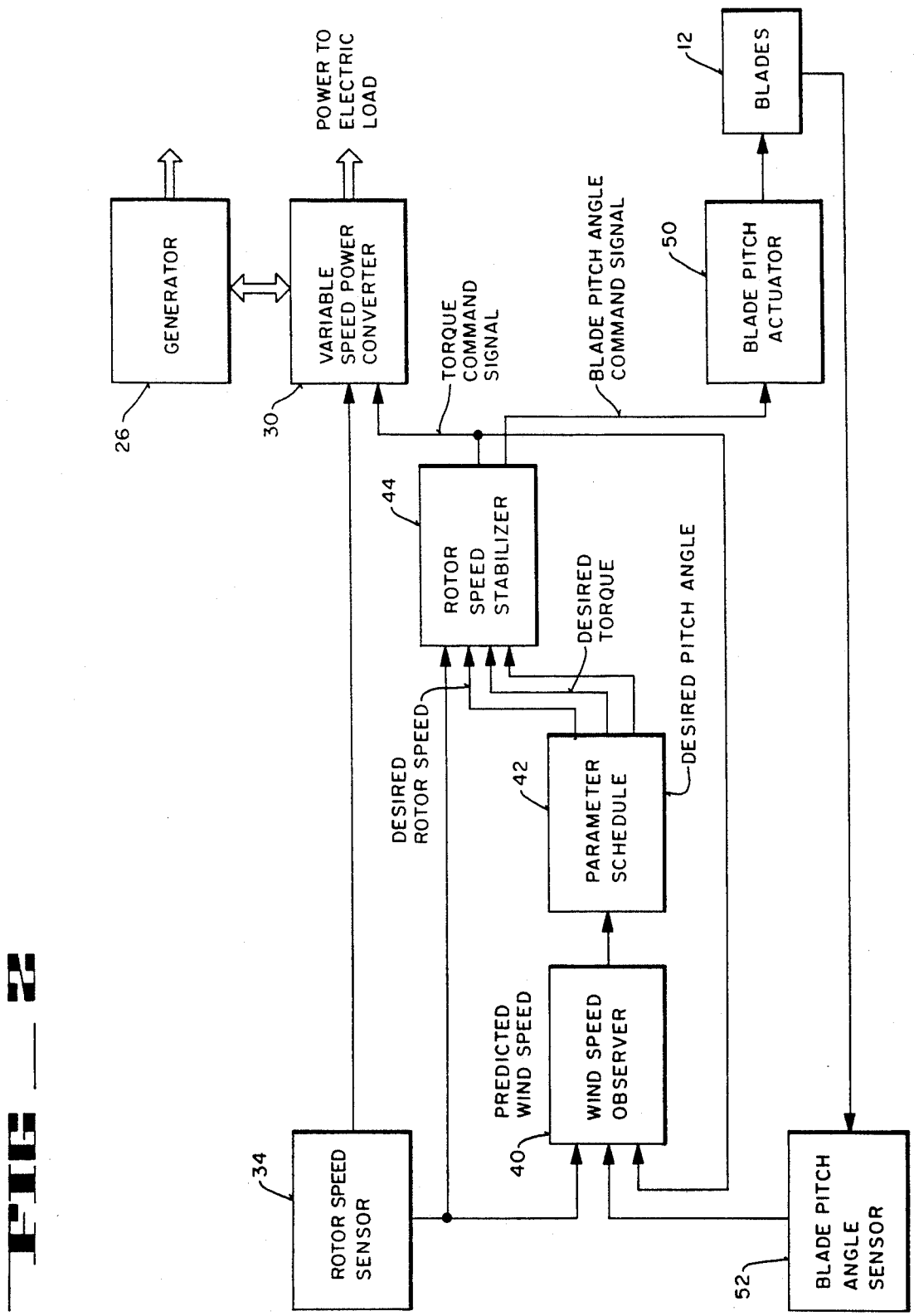

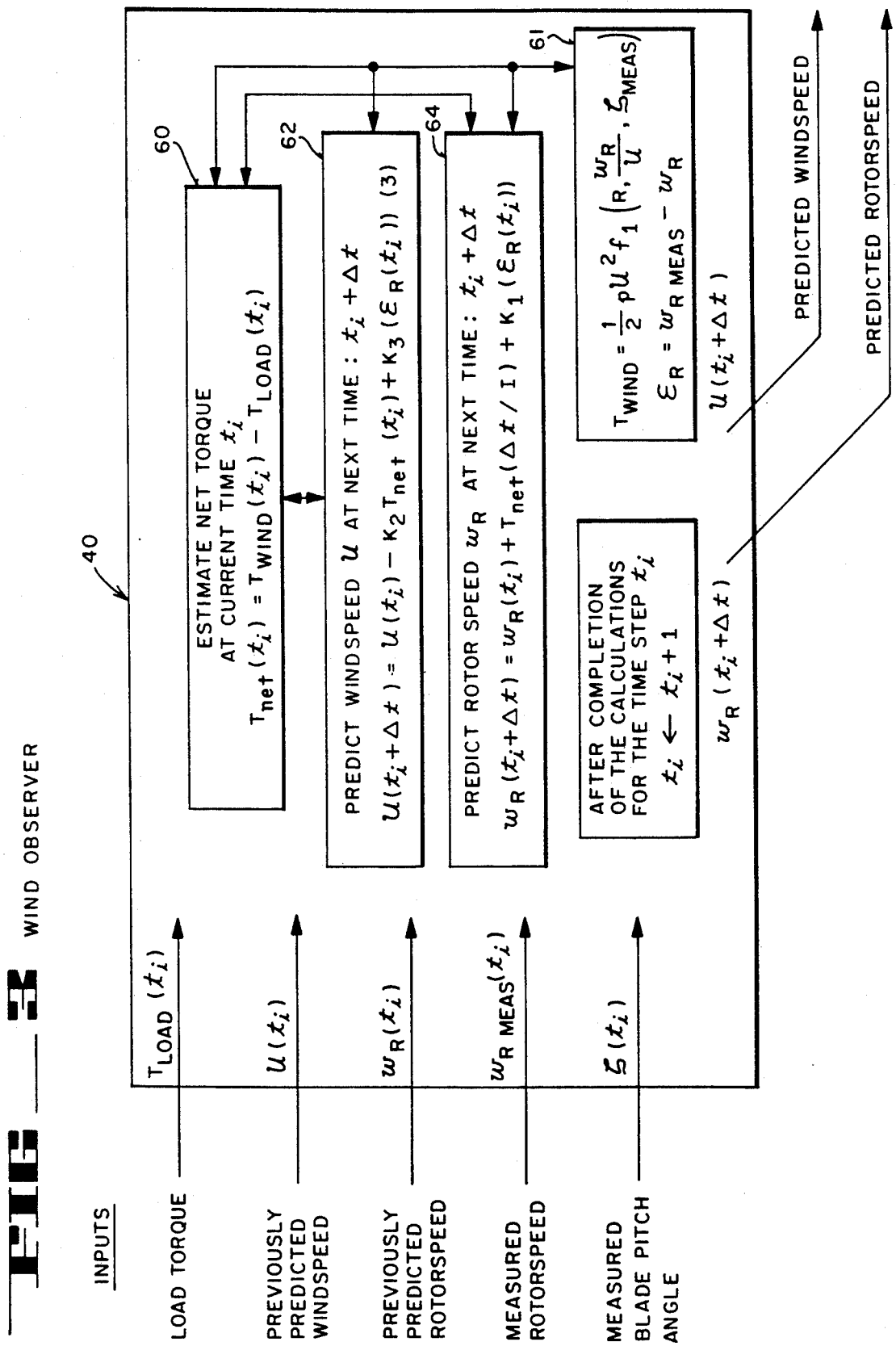

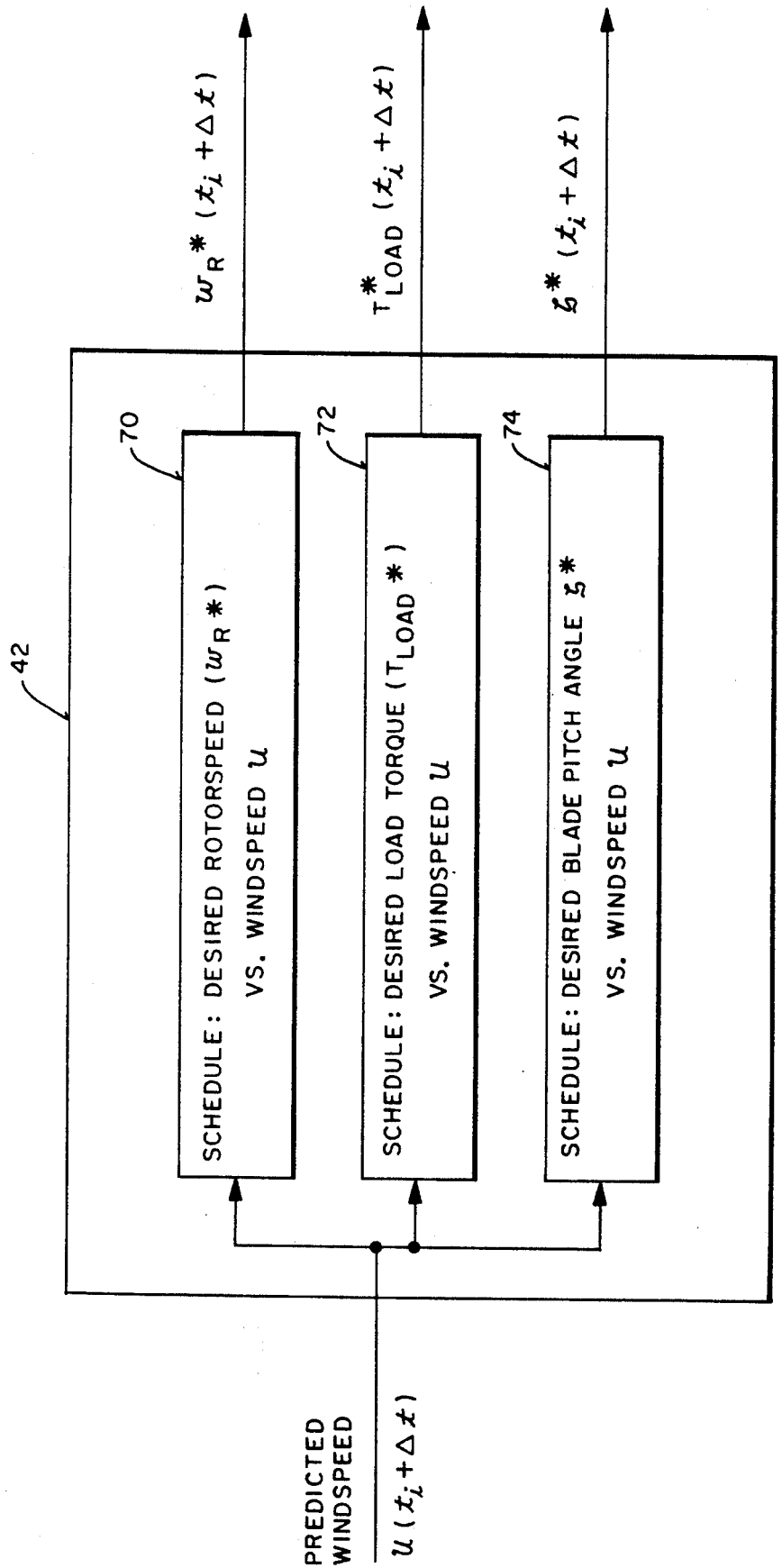
FIG_4 PARAMETER SCHEDULE

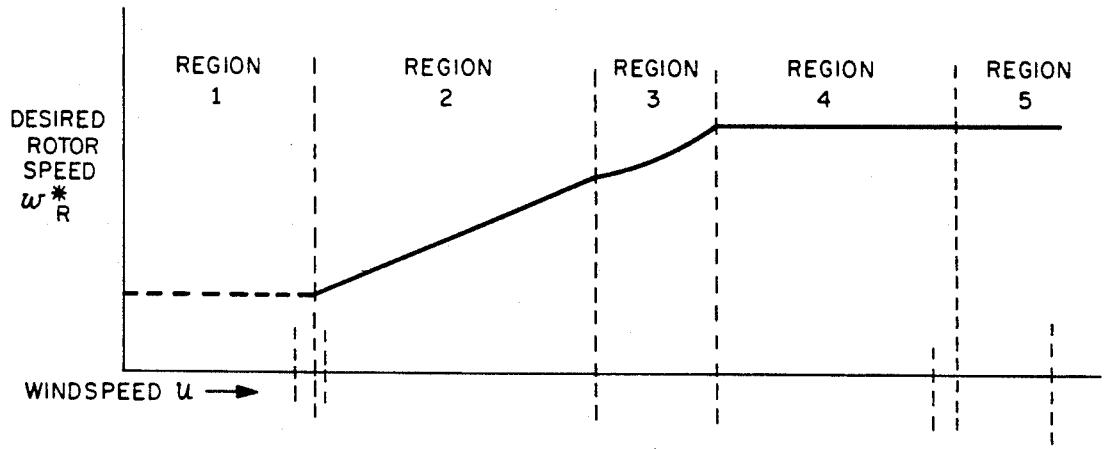
FIG_5A
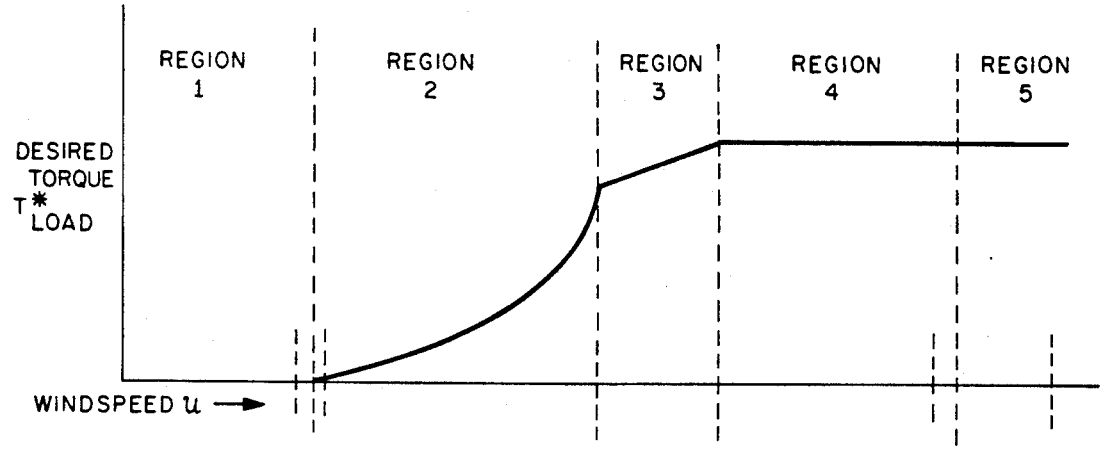
FIG_5B
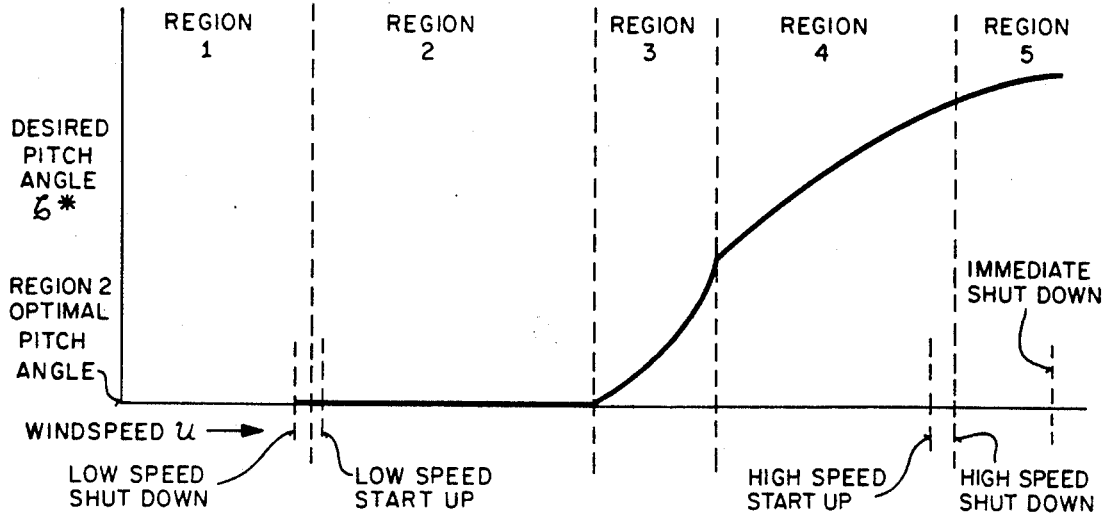
FIG_5C

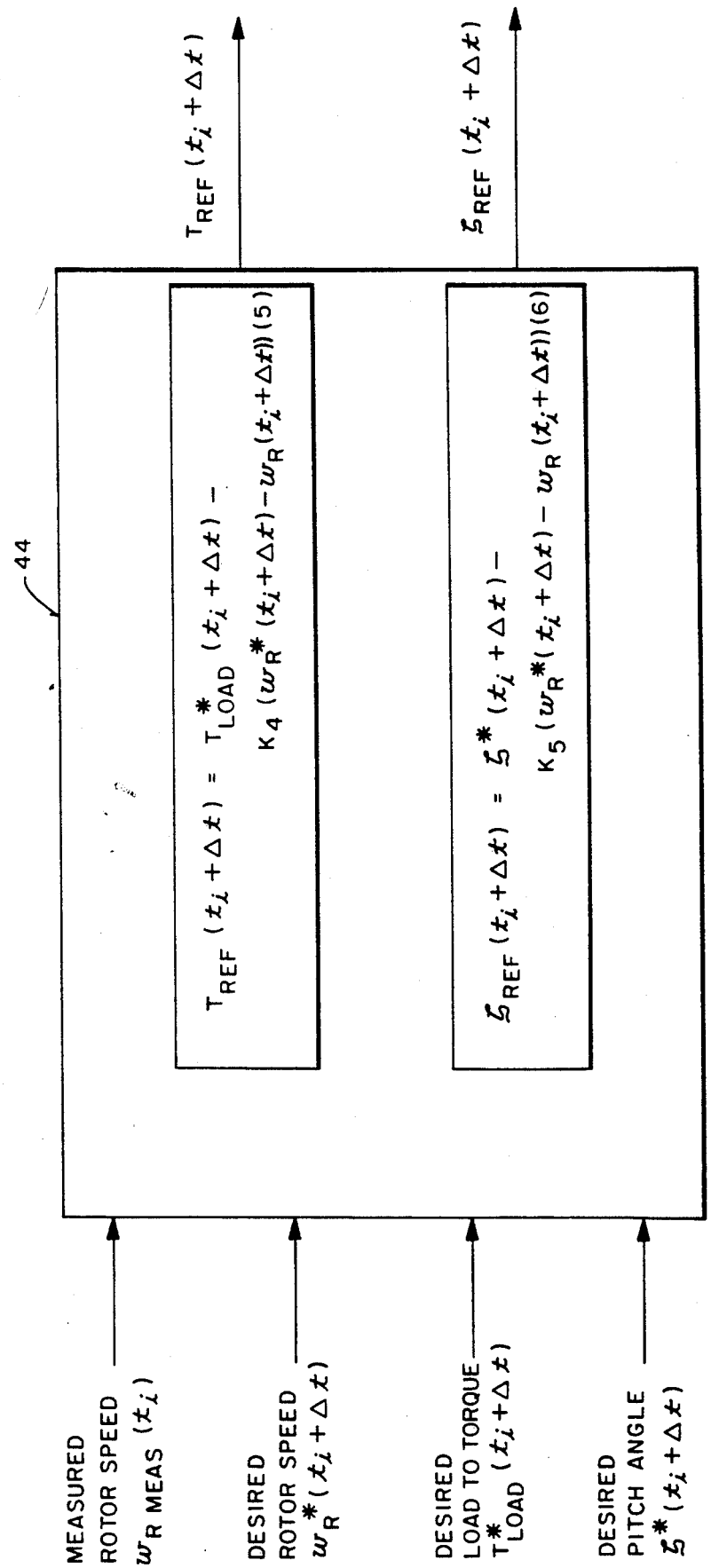

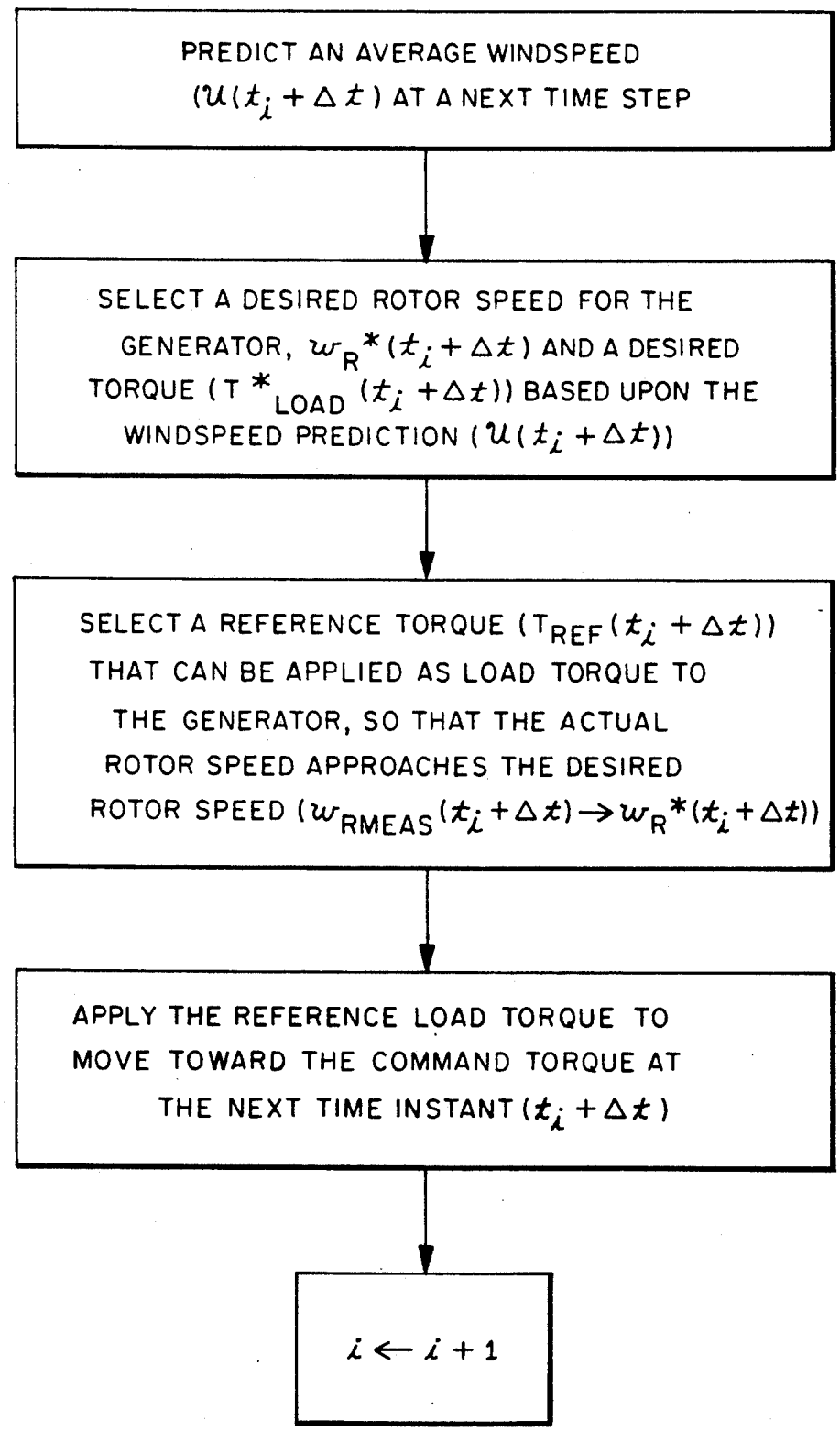
FIG _ 7

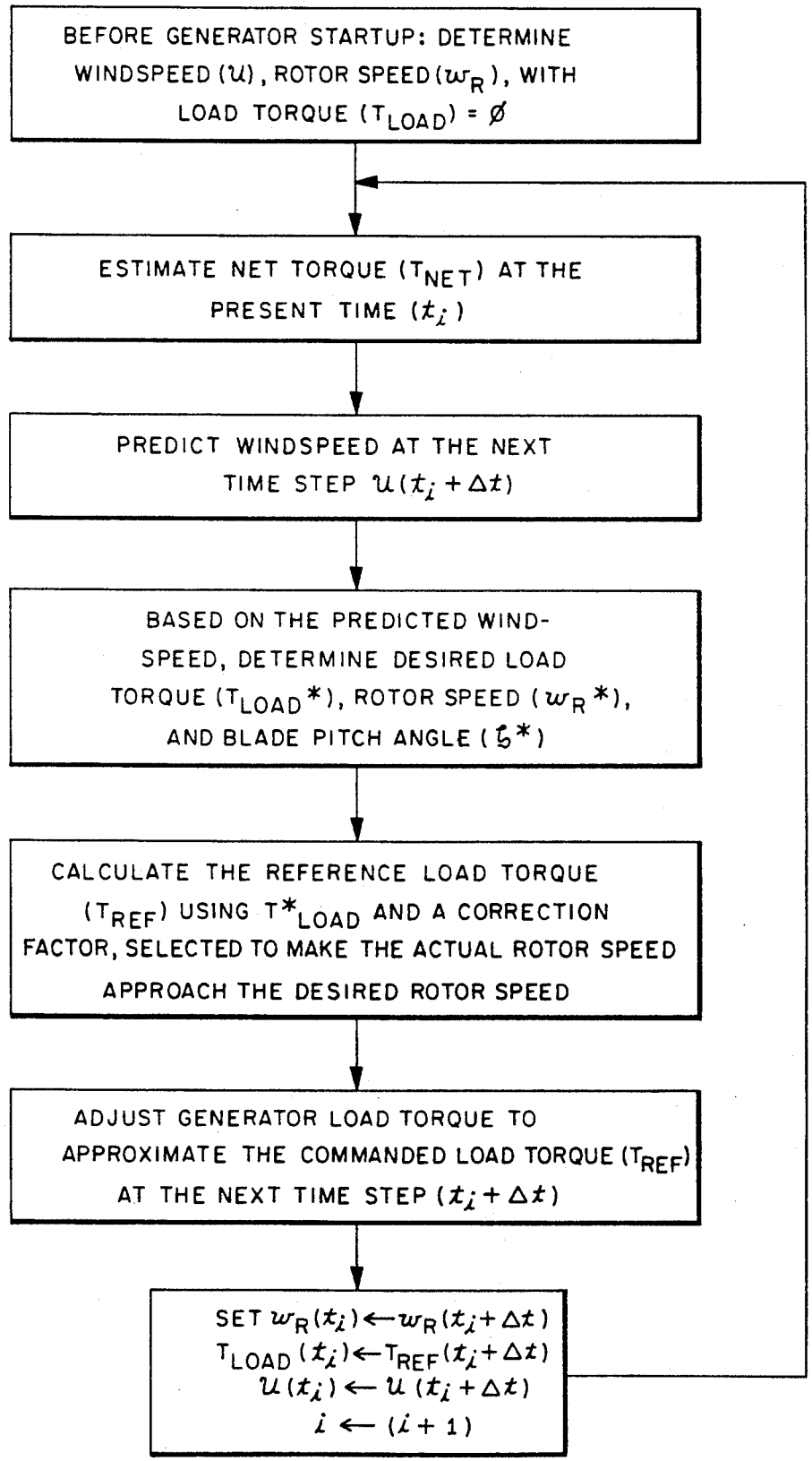
FIG_8

SPEED CONTROL SYSTEM FOR A VARIABLE SPEED WIND TURBINE

BACKGROUND OF THE INVENTION

1. Field of the Invention

The present invention relates to a high efficiency wind turbine, and more specifically, to a rotor speed controller for a variable speed wind turbine that adjusts the rotor speed based on observed and commanded parameters.

2. Description of Related Art

Wind turbines have received increased attention over the past couple of decades as an environmentally clean energy source that is not dependent on limited fossil fuels. Presently, at certain times during the summer in California, Pacific Gas & Electric gets up to 8% of its power from wind. Wind turbines are typically clustered in large numbers that make up wind power generating plants. In addition to windy sites developed in California, many windy locations within the United States have been identified as having a potential for profitable wind power generating plants.

Most wind turbines currently operate at constant speed. The rotor within them drives a generator, such as an induction generator, at a constant rotational speed. Constant speed operation is required for a direct link with a constant frequency electrical grid such as the 60 Hz electrical common in the United States.

However, operation at a constant speed has many drawbacks, a significant one of which is a loss of efficiency. The efficiency loss is particularly apparent in gusty conditions in which the wind speed rapidly fluctuates. In order to maintain constant speed during an increasing wind, braking must be applied, either electrical, mechanical or both. During a decreasing wind, energy must be applied to maintain the constant speed. In either instance, some of the wind energy in the gust is wasted. Furthermore, braking induces structural stresses on the drive train that reduce reliability and hasten the onset of fatigue. In technical terms, constant-speed turbines are optimized for energy capture at a particular wind speed. Wind speeds above and below that point result in less-than-optimal energy capture.

Variable speed wind turbines have been proposed as a solution to the drawbacks of constant speed wind turbines. In principle, variable speed wind turbines can provide much more efficient energy conversion. A variable speed machine's rotor will speed up with higher winds, providing reduced torque and mechanically softer loads through the drivetrain. Therefore variable speed wind turbines are subject to less stress than constant speed turbines, requiring less stringent drive train design parameters. Variable speed turbines should be more reliable and provide cost savings over the constant speed type.

For optimum efficiency, the rotor speed of a variable speed wind turbine should be proportional to the wind speed. It is highly desirable if the rotor speed is a linear function of wind speed. For example, during periods of increasing wind speed, the rotor should increase speed to follow the wind speed; during periods of decreasing wind speed, the rotor should decrease its speed. If the winds are fluctuating very slowly, a variable turbine speed without a rotor control system will be able find its own efficient operating speed. However, in typical gusty conditions, in which the wind speed is fluctuating, a substantial time lag can occur between beginning of a gust, and the rotor response time required to increase or decrease rotor speed to respond to the gust. During this time lag, the wind turbine is not operating efficiently.

Therefore, it would be an advantage to provide a controller that maintains an optimum relationship between rotor speed and wind speed; i.e., rotor speed should precisely track wind speed. For greater efficiency, the controller should immediately increase rotor speed during increasing wind speed and immediately decrease rotor speed during decreasing wind speed. Such a controller should be stable as a control system. However, the controller should respond quickly, not sluggishly, as many very stable control systems do. Additionally, the control system should allow for physical limitations of the turbine, such as the maximum allowable torque on the drive train, aerodynamic thrust on the rotor and power in the electrical system.

In order to track wind speed, it is necessary to know the average wind speed over the area swept by the blades of the wind turbine. In an attempt to provide an estimate of average wind speed, anemometers have been installed close to the area swept by the blades. However, anemometers cannot accurately measure the average wind speed of interest. One reason is that they can measure wind speed at only one location, while wind speed may vary considerably over the disk swept by the blades. Multiple anemometers may be better able to provide an estimate of the average speed. However they are not cost effective and are not sufficiently accurate. For example, an anemometer may be affected by the varying wind flow blockage of the rotor. Furthermore, with multiple systems, reliability in the field becomes a concern.

As a substitute for wind speed information, other controllers have measured quantities such as output electrical power and rotor speed and controlled torque using these quantities. However, these quantities are subject to forces in addition to the wind, and therefore provide only a very rough estimate of the wind speed. It would be an advantage if the wind speed could be measured accurately as an average over the area swept by the blades of the wind turbine. It would be a further advantage if the average wind speed could be predicted at a subsequent point in time, and if the rotor speed could be adjusted to quickly track the wind speed for efficient operation.

SUMMARY OF THE INVENTION

The present invention provides a method and a controller for operating a variable speed wind turbine that allows the wind turbine to better track wind variations for greater efficiency in conversion of wind energy to electrical energy. In operation, the controller of the invention can efficiently extract power during fluctuating wind conditions by controlling the rotor speed to approximately follow the varying wind speeds. Specifically, the rotor speed is increased to follow a predicted increase in wind speed, but is decreased to follow a predicted decrease in wind speed. Knowing the wind speed at a subsequent point in time allows the controller to determine desired operating characteristics in advance and to control the rotor speed so that those desired operating characteristics are implemented. Although discussed in the context of wind turbines, the present invention has broader application as a controller in any variable speed electrical generator that is supplied with varying power, or in a motor controlled by electrical parameters that supplies variable power.

According to the invention, the controller for a variable speed electrical generator predicts a power parameter indicative of the amount of power available from the power source at a subsequent point in time. Using this power parameter, a rotor speed is selected for that subsequent point in time. To apply the selected rotor speed, the rotor speed is controlled to approximate the desired rotor speed at the subsequent point in time. In the preferred embodiment, the electrical generator is powered by a wind turbine having at least one aerodynamic surface sweeping an area that presents a given cross section to the time varying wind. Thus in the preferred embodiment, the power parameter is wind speed.

The generator for a wind turbine has a shaft rotable by the wind which can be viewed as a varying power source. According to the invention, a parameter is predicted that is indicative of the power that will be provided at a next time step $t + \Delta t$. In the preferred embodiment for a wind turbine, the predicted parameter is the wind speed. This predicted parameter is used to determine desired values for rotor speed and the control parameters. Based on these desired values, the actual values of the control parameters are commanded for the next time step $t + \Delta t$. During wind turbine operation, the process is repeated for each subsequent time interval $\Delta t$, using the previously predicted values as the base values for the next prediction.

More specifically, in the preferred embodiment, the wind turbine controller includes a wind observer, a parameter schedule, and a rotor speed stabilizer, each of which will be discussed in sequence.

The wind observer predicts wind speed and rotor speed at a next time step $t + \Delta t$, based on known or estimated parameters at a present time t. The known or estimated parameters used by the wind observer include load torque, current wind speed, and current rotor speed. If the blade pitch angle is variable, then that parameter also is used by the wind observer. The wind observer calculates the aerodynamic torque as a function of present wind speed, rotor speed and other aerodynamic variables. Then the net torque is calculated by subtracting the load torque from the aerodynamic torque. The wind speed at a next time step can be predicted by the wind observer as a function of the present (previously predicted) wind speed, using correction terms including net torque and the difference between the predicted and actual rotor speed. Similarly, the rotor speed at a next time step can be predicted as a function of the present (previously predicted) rotor speed, net torque, and a correction term including the difference between the predicted and actual rotor speed. The correction terms cause the computed values of wind speed and rotor speed to converge to approximately correct values after several time steps. For a constant wind speed, the computed wind speed converges to a value where the computed aerodynamic torque equals the load torque, and the rotor speed converges to the measured rotor speed. The magnitude of the corrections are chosen so that only a fraction of the required correction for zero error is applied at each step therefore insuring dynamic stability of the observer process. Therefore, the calculations proceed repeatedly, and the windspeed and rotor speed are updated at each time interval $\Delta t$ which may be as small as a fraction of a second.

During operation of the wind observer, the wind speed and rotor speed values will quickly converge to approximately correct values, even if the initial values were wrong or if the wind power is fluctuating. Furthermore, the wind observer is useful whenever the wind turbine rotor is turning, whether or not it is producing power. If no power is being produced, the load torque is set to zero in the calculations and the wind observer will converge to an approximately correct wind speed value. This information is useful in deciding whether or not the wind speed is sufficient for power generation. It is also useful during startup of power generation so correct initial values for wind speed and rotor speed are available.

The wind turbine controller of the invention includes a parameter schedule which uses a wind speed prediction supplied by the wind observer as the independent variable. The parameter schedule includes values that implement desired operating characteristics for the wind turbine. Specifically, the schedule includes a series of values for desired torque, rotor speed and pitch angle (if pitch is variable), all as a function of wind speed. The values in the schedule are chosen by the designer and are highly dependent upon the particular wind turbine being controlled. Factors that influence the schedule curves include the aerodynamic qualities of the wind turbine, structural and electrical constraints and efficiency in energy conversion.

The wind turbine controller also includes a rotor speed stabilizer which calculates a load torque, termed a reference load torque, to be commanded at the next time step. In order to calculate the reference load torque, the rotor speed stabilizer uses torque and rotor speed from the parameter schedules based upon wind speed prediction. The reference torque is calculated using both the torque from the schedule and an additional term that takes into account rotor speed error. If the wind turbine includes variable pitch blades, then the rotor speed stabilizer also controls the pitch of the blades.

To attain the commanded reference torque during operation, a power converter controls the electrical load torque within the generator. This has the effect of adjusting the rotor speed in accordance with the desired operating curve. Thus the wind turbine can be operated efficiently and safely within its structural and electrical limits.

According to the present invention, the method for controlling the rotor speed of a variable speed wind turbine includes predicting the average wind speed at a next time step $t + \Delta t$. and applying the predicted wind speed to the parameter schedule to select desired values for rotor speed and load torque. In accordance with these desired values, a command reference torque to be applied as a load torque to the generator is selected, so that the actual rotor speed may approach the desired rotor speed.

BRIEF DESCRIPTION OF THE DRAWINGS

FIG. 1 is a perspective view of a wind turbine generator;

FIG. 2 is a block diagram of a preferred embodiment of a control system for the wind turbine generator;

FIG. 3 is a diagrammatic illustration of the wind speed observer;

FIG. 4 is a diagrammatic illustration of the parameter schedule;

FIGS. 5A, 5B and 5C are graphs illustrating desired operating curves included in the preferred embodiment;

FIG. 6 is a diagrammatic illustration of the rotor speed stabilizer;

FIG. 7 is a flowchart illustrating operation of a wind turbine controller; and

FIG. 8 is a flowchart illustrating operation of a wind turbine controller.

DETAILED DESCRIPTION OF THE INVENTION

The invention is best understood by reference to the figures wherein like parts are designated with like numerals throughout.

A control system in accordance with the present invention can be used in the system described in a commonly assigned, co-pending patent application having Ser. No. 07/649,567, now U.S. Pat. No. 5,083,039, entitled "VARIABLE SPEED WIND TURBINE", filed by R. D. Richardson and W. L. Erdman on Feb. 1, 1991, the specification of which is incorporated by reference herein. That application describes a torque command system that controls a generator to meet the reference torque supplied by the rotor speed stabilizer described in this specification.

The present invention provides a method and a controller for operating a variable speed wind turbine that achieves greater efficiency in conversion of wind energy to electrical energy. From an overall viewpoint, the controller controls the wind turbine to approximately follow the varying wind speeds. When a wind speed increase is predicted, rotor speed is increased; when a wind speed decrease is predicted, rotor speed is decreased. Although discussed in the context of wind turbines, the present invention has broader application as a controller for a variable speed electrical generator or a motor which operates at a variable power level.

A perspective view of a wind turbine generator is shown in FIG. 1. An exemplary wind turbine is indicated generally at 10, mounted on a pedestal 11. Wind turbine 10 has one or more blades 12 connected to a shaft 14. When wind blows from the direction 16, the blades 12 and the shaft 14 rotate in the direction of arrow 18. However, in other embodiments, the rotational direction may be in the opposite direction from the direction of arrow 18 with equivalent but opposite effect. Furthermore, other wind turbine configurations, such as vertical axis wind turbine configurations, may be used with equal utility.

Thus the wind supplies a torque to the shaft 14 in the rotational direction 18 and the amount of supplied torque is a function of the wind speed and rotor speed. The wind speed will be variable and therefore so will the torque. The rotating shaft 14 turns a transmission 20 which increases the rotational speed of a rotor 22, including a generator rotor that rotates in the direction of arrow 24. The rotor 22 turns within an electrical generator 26 to provide electrical power on an output cable 28. A power converter 30 is connected to cable 28 to convert the electrical power to a selected type of electrical power, such as three-phase, 60 Hz alternating current. The electrical power can then be delivered to an electrical grid 32 or any other load.

The torque supplied by the wind through transmission 20 to rotor 22 at any time t will be termed the "aerodynamic driving torque". The rotational speed of rotor 22 will be termed the "rotor speed". The rotor speed may be monitored by a rotor speed sensor 34. To counter the aerodynamic driving torque provided by the wind and to generate electricity, a "load torque" is supplied by generator 26 in a direction illustrated by arrow 36. Implementation of a commanded load torque, termed a "reference" load torque, can be accomplished by conventional means, but preferably the commanded reference load torque in the generator is implemented as discussed in the commonly assigned, co-pending application referenced above, which controls the current or the voltage within the stator by field orientation coordinates to achieve the reference torque.

FIG. 2 is a block diagram that illustrates the control system for a variable speed, pitch angle-regulated wind turbine. Although described in the context of a pitch angle-regulated turbine, the present invention would also have application if the wind turbine were not pitch angle-regulated (e.g., stall regulated), in which case the pitch angle would simply be taken as a constant in the control system algorithm.

As illustrated, a wind speed observer 40 provides an estimated wind speed to a parameter schedule 42 of desired operating parameters. Based on the wind speed, the parameter schedule outputs values of a desired rotor speed, a desired generator load torque, and a desired blade pitch angle. These desired values are input to a rotor speed stabilizer 44, which also receives the sensed rotor speed as an input from the rotor speed sensor 34. Rotor speed stabilizer 44 outputs command signals including a torque command signal and a blade pitch angle command signal. The torque command signal is supplied to the variable speed power converter 30. The blade pitch angle command signal is supplied to a blade pitch actuator 50, which controls the pitch angle of the blades 12. In order to provide an accurate pitch angle, a blade pitch angle sensor 52 senses the pitch angle of the blades 12. The pitch angle is supplied to the wind speed observer 40 by the blade pitch angle sensor 52. Additional inputs are supplied to the wind speed observer 40, these inputs including the sensed rotor speed from the rotor speed sensor 34 and the torque command signal from the rotor speed stabilizer 44.

Described in more detail below are wind speed observer 40, parameter schedule 42 and rotor speed stabilizer 44. Mathematical variables and formulas are used in parts of the detailed description of the preferred embodiment. A complete list of these variables and their meaning is included in Appendix A. In the following discussion, the variable $t_i$ refers to the current time (the time at which the calculations and measurements are made). The amount "i" increases by one with each interval of prediction. The variable $\Delta t$ refers to the time interval of prediction. In the preferred embodiment, the variable $\Delta t$ is approximately 50 milliseconds. It is generally advantageous to have a smaller $\Delta t$; however there may be some applications in which a larger $\Delta t$ may be advantageous.

THE WIND OBSERVER 40

FIG. 3 is a diagrammatic illustration of the structure and the method of operation of the wind observer 40. The outputs from the wind observer 40 include the predicted wind speed $U(t_i+\Delta t)$ and the predicted rotor speed $\omega_R(t_i+\Delta t)$.

The inputs to the wind observer 40, to be described, are supplied by conventional sensors or other reliable sources of information. Referring both to FIGS. 1 and 3, for example, one of the inputs to wind observer 40 is the load torque applied to the generator 26. If the variable speed power converter 30 can reliably achieve its commanded torque, defined as $T_{ref}$, then that value is suitable for use in the wind observer 40 as $T_{load}$. However, other estimates for $T_{load}$ may also be used by the wind observer 40, such as those which, based on the relationship between speed, torque, and power (speed×torque=power), take into account the conversion efficiency and the losses in the electrical system. Another method of estimating $T_{load}$ is to utilize electrical current measurements on the generator side of the converter along with a rotor speed measurement to compute the torque using a field orientation model of the generator. A third method is to measure generator stator current and voltage as well as rotor speed and then to process these measurements through a stator reference model to estimate the torque.

The measured rotor speed, $\omega_{Rmeas}(t_i)$, may be supplied by a conventional sensor, such as an optical sensor, and the measured blade pitch angle, $\zeta_{meas}(t_i)$, may also be supplied by a conventional sensor, such as a sonic linear position transducer.

The net torque at the current time, illustrated in a box 60, is estimated as the difference between the aerodynamic driving torque supplied by wind power, $T_{wind}(t_i)$, and the load torque, $T_{load}(t_i)$:

$$T_{net}(t_i) = T_{wind}(t_i) - T_{load}(t_i) \quad (1)$$

The value for $T_{load}(t_i)$ has been previously described. The value for $T_{wind}(t_i)$ is a measure of the aerodynamic driving torque. It is estimated, as illustrated in a box 61, as a function of aerodynamically varying quantities, such as the tip-speed ratio ($R\omega_R/U$) and the blade pitch angle ($\zeta(t)$):

$$T_{wind}(t_i) = \tfrac{1}{2}\pi U^2(t_i) f_1[R\omega_R(t_i)/U(t_i), \zeta(t_i)], \quad (2)$$

where
  $t_i$ is the current time step
  $U(t_i)$ is the wind speed that was previously predicted for the current time step
  $f_1(.)$ is an aerodynamically derived function, dependent on tip speed ratio and any varying aerodynamic parameters.
  R is the rotor radius
  $\omega_R(t_i)$ is preferably the observer rotor speed predicted for the current time step (alternatively, the measured rotor speed $\omega_{Rmeas}$ could be used)
  $T_{wind}(t_i)$ is the estimate of the torque supplied by wind power
  $\pi$ is the air density
  $\zeta(t_i)$ is the blade pitch angle The function $f_1$ is aerodynamically derived and its form is dependent upon the size and shape of the blades. The shape of the blades is chosen as a trade-off between considerations such as rotor power performance, structural stiffness requirements, insensitivity to surface roughness uncertainties and manufacturability constraints. In the process of wind turbine blade design, the aerodynamic power efficiency coefficient $C_p$ is typically computed using the Glauert blade element theory (see Eggleston and Stoddard, "Wind Turbine Engineering Design" (1987)). In the preferred embodiment, the function $f_1$ is a function of the two independent variables, the tip speed ratio ($R\omega_R/U$) and the blade pitch angle $\zeta$, and is calculated as described in equation (3) Neglecting drive train losses, the function $f_1$ is given by the simple relation:

$$f_1(R\omega_R/U, \zeta) = \pi R^3 (U/R\omega_R) C_p(R\omega_R/U, \zeta) \quad (3)$$

where
  $C_p$ is a turbine power coefficient computed in accordance with conventional methods In practice, the function $f_1$ can also be determined experimentally for a given wind turbine blade design. For the purpose of the wind observer 40, the values of the function $f_1$ are stored as a two dimensional array depending on an index related to the tip speed ratio and an index related to the blade pitch angle $\zeta$. Values not in the table are then determined by interpolation.

Having obtained $T_{net}(t_i)$ from eqn. 1, the wind speed at the next time step, $U(t_i+\Delta t)$, can be predicted, as illustrated in a box 62, from the current wind speed $U(t_i)$, and correction terms:

$$U(t_i+\Delta t) = U(t_i) - K_2 T_{net}(t_i) + K_3(\epsilon_R(t_i)) \quad (4)$$

where
  $t_i$ is the current time
  $\Delta t$ is the time step
  $U(t_i)$ is the wind speed predicted for the current time step
  $U(t_i+\Delta t)$ is a prediction of the wind speed at the next time step
  $T_{net}(t_i)$ is the estimate of the net torque on the system
  $K_2, K_3$ are constant gains for providing dynamic stability
  $\omega_R(t_i)$ is the rotor speed predicted for the current time step
  $\omega_R(t_i+\Delta t)$ is a prediction of the rotor speed at the next time step.
  $\omega_{Rmeas}(t_i)$ is the measured rotor speed
  $\epsilon_R(t_i)$ is the rotor speed error ($\omega_{Rmeas}(t_i) - \omega_R(t_i)$)

The equation (4) includes two correction terms that provide stable correction of the current wind speed prediction $U(t_i)$. In the first correction term, the net torque $T_{net}$ is multiplied by a constant $K_2$. If the net torque $T_{net}(t_i)$ is positive, then the previous wind speed prediction is likely to be high, and therefore the next wind speed prediction is decreased by the first correction term. Conversely, if the net torque $T_{net}(t_i)$ is negative, then the previous wind speed prediction is likely to be low, and the wind speed prediction is increased by the first correction term. The constant $K_2$ is chosen for stability of the algorithm during subsequent stages. In other embodiments, the first correction term may be some function of the net torque $T_{net}$, which is positive if $T_{net}$ is positive and negative if $T_{net}$ is negative. It is preferable that the function be decreasing as the net torque decreases and increasing as the net torque increases.

In another embodiment, the net torque correction term in the wind speed observer can be replaced with a correction term proportional to a wind speed observer error. This wind speed error may be defined as the difference between the current wind speed prediction $U(t_i)$ and the actual wind speed. A measure of the actual wind speed may be provided by an anemometer or other sensor means. The effect of this correction will be to balance uncertainty in the wind speed measurement with uncertainty in the aerodynamic calculation of the net torque which will still be applied to the rotor speed observer equation (5) as discussed in the following paragraphs. However, as discussed in a previous section, the uncertainty in the wind speed measurement will likely be large compared to the uncertainty in the aerodynamic computation, thus the net torque correction term will be more effective in most cases.

A second correction term is rotor speed error multiplied by a constant $K_3$, chosen for algorithm stability. If the actual rotorspeed is lower than predicted, then the previous wind prediction is likely to be high and therefore the second correction term reduces the next wind speed prediction. Conversely, if the actual rotor speed is higher than predicted, then the previous wind prediction is likely to be high and therefore the second correction term reduces the next wind speed prediction. Like the first correction term, the second correction term may be some function of the rotor speed error if it has the appropriate properties.

The rotor speed at the next time step can also be predicted, as illustrated in a box 64, by a formula:

$$\omega_R(t_i+\Delta t)=\omega_R(t_i)+T_{net}\Delta t/I+K_1\epsilon_R(t_i) \quad (5)$$

where $\omega_R(t_i)$ is the rotor speed predicted for the current time step $\omega_R(t_i+\Delta t)$ is a prediction of rotor speed at the next time step $K_1$ is a constant gain for providing dynamic stability $I$ is the rotational inertia Like equation (4), the rotor speed prediction in equation (5) has a correction term based on rotor speed error. In other embodiments, another function having similar properties can provide this correction term.

After the predictions for wind speed $U(t_i+\Delta t)$ and rotor speed $(\omega_R(t_i+\Delta t))$ are complete, these values are output from the wind observer 40.

To move to the next time step, the increment "i" is increased by one so that the previously predicted values become the current values for the next step $t_i+\Delta t$, as illustrated in a box 64. The calculation process is repeated for each time step $\Delta t$. In the preferred embodiment, the time step $\Delta t$ is 50 milliseconds. However, in another embodiment, the time step $\Delta t$ may be larger or smaller depending on circumstances such as the computing power available. The wind observer calculations are repeated at each time step $\Delta t$. Therefore, wind speed and rotor speed values are updated at each time step. During operation of the wind observer, the predicted wind speed and torque values will quickly converge to approximately correct values, even if the aerodynamic driving torque is fluctuating.

Preferably, the wind observer 40 is operating whenever the blades 12 of wind turbine 10 are turning, whether or not the generator 26 is producing power. For example, a light wind may turn the rotor 22 even if power is not being produced. In that instance (the "wind speed sensing state"), the rotor is "free-wheeling" with no load torque ($T_{load}=0$) and a constant pitch angle $\zeta$. In the wind speed sensing state, the load torque, $T_{load}$, is set to zero for calculation purposes and the wind observer will converge to an approximately correct wind speed value. As windspeeds increase and approach power generation levels, knowledge of the wind speed is useful for making an informed decision regarding whether or not the aerodynamic driving torque is adequate for power generation. When a decision is made to start power generation, wind speed knowledge is useful for supplying an approximately correct initial value for wind speed $U$ and rotor speed $\omega_R$ to the wind observer 40. However, wind speed knowledge is not essential for start-up. If no initial value has been obtained, a reasonable guess is adequate. The algorithms will converge to a correct answer within a few seconds (typically less than 100 times steps). When the wind turbine is in a state where it is not producing power, a decision must be made regarding when to start up power generation. The decision may be made automatically, by a computer according to set criteria or it may be made by an operator who is monitoring the wind turbine's operation. The decision process may take into account the average wind speed as well as the higher windspeeds during the gusts and the lower windspeeds during the lulls between gusts. Currently, in the preferred embodiment, the decision is made automatically based on average wind speed and predetermined values for start-up and shutdown, as will be described in the next section.

PARAMETER SCHEDULE 42

Referring to FIG. 3, the predicted value for wind speed, $U(t_i+\Delta t)$, supplied by wind observer 40, is applied to the parameter schedule 42. Referring to FIG. 4, which shows the parameter schedule 42 in the preferred embodiment, schedule 42 includes desired operating characteristics for the wind turbine. In the preferred embodiment, the parameter schedule 42 includes three separate schedules, a desired rotor speed vs. wind speed schedule 70, a desired load torque vs. wind speed schedule 72 and a desired blade pitch angle vs. wind speed schedule 74. Other embodiments may include fewer or more schedules. For example, a stall-regulated turbine whose blades have a constant pitch would not need schedule 74 for blade pitch angle vs. wind speed. The predicted wind speed, $U(t_i+\Delta t)$, is associated with a particular desired value, supplied from the parameter schedule 42. The desired values are noted in this application with a star "*" following the variable symbol.

Schedule 42 specifies desired parameters for an operating wind turbine, i.e., one that is producing power. A wind turbine does not produce power if there is insufficient wind. In low wind conditions, for example an average wind speed between 0 mph and 10 mph, the wind speed is insufficient to provide a minimum driving torque for power generation. The wind turbine may simply be shut off, or it may be allowed to freewheel. In the preferred embodiment, the rotor is typically allowed to freewheel with the low wind. During freewheeling, the blade pitch is held to a constant angle $\zeta$. As described previously, the wind observer may be used to determine wind speed during freewheeling operation. Also, if the wind is too strong, the wind turbine must be shut down to protect itself from damage. The wind turbine may be shut down by providing a breaking torque above the aerodynamic driving torque and fully feathering the blades so that they provide no aerodynamic torque.

The values supplied in the parameter schedule 42, $T_{load}*$, $\omega_R*$, and $\zeta*$, are pre-selected by the designer and are highly dependent upon the particular wind turbine being controlled. Factors that influence the schedule curves 70, 72 and 74 include the aerodynamic qualities of the wind turbine, structural and electrical constraints and efficiency of energy conversion. FIGS. 5A, 5B, and 5C are exemplary graphs that show the desired values in the parameter schedule 42 for the preferred embodiment, illustrated as curves. Techniques for calculating these parameters are described in a publication by Holley et al., the inventor herein, in a publication entitled "Optimal Quasistatic Control of Variable Speed Wind Turbines", European Wind Energy Conference and Exhibition, Jul. 10-13, 1989 (EWEC '89) pp. 341-344.

Specifically, FIG. 5A is a graph that shows an exemplary curve for the desired rotor speed, ($\omega_R^*$), vs. wind speed U; FIG. 5B is a graph that shows an exemplary curve for the desired load torque ($T_{load}^*$), vs. wind speed U; and FIG. 5C is a graph that shows an exemplary curve for the desired blade pitch angle ($\zeta^*$), vs. wind speed U.

Reference is made jointly to FIGS. 5A, 5B, and 5C and the wind speed regions shown. In region 1, the wind speed U is low and power is not being generated. In region 2, electric power is being generated by the wind turbine, as indicated by a non-zero desired torque. At some wind speed, termed the "low start-up speed", the wind turbine is turned on to begin power generation. Preferably, the low start-up speed is at, or slightly above, the boundary between Regions 1 and 2. However, the wind speed is almost never constant. Instead, the wind speed is always changing. In some instances, the changing windspeeds may fluctuate between regions 1 and 2. If the average wind speed drops below a "low shut down speed", then power generation is automatically stopped. The low shutdown speed is within region 1, preferably 1-2 m.p.h. less than the low start-up speed. However, if the instantaneous wind speed temporarily drops to region 1 without averaging the low shutdown speed, it would be desirable if the rotor speed $\omega_{Rmeas}$ remain constant. In actual operation, actual rotor speed $\omega_{Rmeas}$ will not remain constant because torque will not be supplied from the power grid to the wind turbine just to keep the rotors turning at a constant speed.

In region 2, the wind speed has increased and the desired rotor speed is a linearly increasing function of the wind speed. Also in region 2, the desired torque increases as the square of wind speed in accordance with the aerodynamic principles described in equation 2. Generally, in region 2 the blade pitch angle $\zeta$ is positioned at the angle for optimum transformation of wind power into the rotor. Note that for the described embodiment, the blade pitch angle is defined so that it has the value zero when the blade is positioned optimally in region 2 and is positive for increasing angles toward the full feather position.

In some turbine designs, damaging structural resonances can occur if the turbine is operated at one or more specific narrow ranges of rotor speed, one of which may fall within Region 2. Within these speed ranges, which are generally very narrow, the values for the desired rotor speed and torque can be adjusted to avoid damage during extended periods of operation at these speeds. Avoidance of these speeds can be accomplished by, for example, maintaining the desired rotor speed at the lower edge of the avoided range for wind speeds that are in the lower half of the wind speed range corresponding to the avoided rotor speed range, and maintaining the desired rotor speed at the upper edge for wind speeds in the upper half. The corresponding desired torque values would be computed from the same aerodynamic principles used in equation 3.

In region 3, fundamental structural or electrical constraints limit the desired rotor speed and the desired torque. The thrust limit of the wind turbine affects the curves, the thrust limit being the limit that can be withstood by the pedestal 11, the rotor 22 and the blades 12 shown in FIG. 1. In region 3, the blade pitch angle $\zeta$ is increased to reduce the thrust, and the increases in load torque are smaller than desired for optimum power generation. From a cost vs. benefit standpoint, the thrust limit may be particularly important in the design of a cost-effective wind turbine.

In region 4, as in region 3, fundamental structural and electrical constraints limit the desired rotor speed and load torque. In region 4, the centrifugal speed limit of the rotor components effectively precludes any further increases in the desired rotor speed, and for the example shown the load torque limit is also coincidentally reached. Therefore both the desired rotor speed $\omega_R^*$ and the desired torque $T_{load}^*$ are constant in this region. The electrical power ratings are chosen to match this mechanical speed and torque limit. The blade pitch angle $\zeta$ is increased with increasing wind speed to reduce the wind power that is translated to driving torque on the rotor.

As windspeeds increase into Region 4, eventually the dynamic load conditions exceed the mechanical and electrical limits. In region 5, if the average wind speed has increased above a "high shutdown speed", the wind turbine must be shut down to prevent damage. However, the estimated wind speed from the wind speed observer can instantaneously be below or above these respective average shut-down wind speeds so that Region 4 is extended to cover all reasonable wind speeds. If the instantaneous wind speed ever exceeds an upper limit, for example 10%, beyond the high shut-down speed which is an average, the turbine is immediately shut down. This is illustrated as an "immediate shut-down speed". In shut-down, whether it occurs at high or low speeds, a load torque providing braking action, typically 10% above the nominal aerodynamic torque computed in the observer, is applied by the generator. In the case of a pitch regulated wind turbine, the blades 12 are simultaneously pitched to full feather. In the preferred embodiment, the pitch angle $\zeta$ illustrated in Region 5 is substantially less than the full feather position, for example 35°-40° with respect to a 90° full feather.

Referring to FIG. 4, the parameter schedules 70, 72, 74 are implemented in a convenient form, such as a ROM or a portion of computer memory. In the preferred embodiment, schedules 70, 72, 74 are implemented as a single table with 3 columns indexed by wind speed. Linear interpolation is used to estimate in-between values. The desired values from parameter schedules 70, 72, 74 are supplied to the rotor speed stabilizer (FIG. 2), which controls the torque $T_{load}$ and the blade pitch angle $\zeta$ to cause the rotor speed to approach the desired value with as small an error as possible.

THE ROTOR SPEED STABILIZER 44 (FIG. 6)

Using the desired values for rotor speed, $\omega_R^*(t_i+\Delta t)$, and the load torque, $T_{load}^*(t_i+\Delta t)$, the rotor speed stabilizer 44 calculates a load torque $T_{ref}(t_i+\Delta t)$ for the next time step. In the preferred embodiment, the load torque $T_{ref}(t_i+\Delta t)$ is the sum of two terms, the desired load torque, $T_{load}^*(t_i+\Delta t)$ and an additional stability correction term that takes into account the desired rotor speed $\omega_R^*$ and the predicted rotor speed $\omega_R$:

$$T_{ref}(t_i+\Delta t) = T_{load}^*(t_i+\Delta t) - K_4(\omega_R^*(t_i+\Delta t) - \omega_R(t_i+\Delta t)) \quad (6)$$

Specifically, the stability correction term is proportional to the deviation in the predicted rotor speed from the desired rotor speed. The function of the correction term is as follows. If the rotor speed is too high, the torque is increased to slow it down. If the rotor speed is too low, the torque is decreased to speed it up. Furthermore, if $T_{ref}(t_i+\Delta t)$ is calculated to be negative, then it is treated as zero. A negative $T_{ref}$ could be calculated if the desired rotor speed $\omega_R^*$ is much greater than the predicted rotor speed $\omega_R$.

To attain the commanded torque, $T_{ref}$, during operation, the rotor speed stabilizer 44 controls the electrical load torque within the generator, which has the effect of adjusting the rotor speed in accordance with the desired operating curve. If the wind turbine includes variable pitch blades, then the rotor speed stabilizer 44 can also control the pitch angle $\zeta$ of the blades to meet the desired value for rotor speed. To obtain a reference blade pitch angle $\zeta_{ref}$, a stability correction term may be added to the desired blade pitch angle $\zeta^*$ to correct for errors.

$$\zeta_{ref}(t_i+\Delta t)=\zeta^*(t_i+\Delta t)-K_5(\omega_R^*(t_i+\Delta t)-\omega_R(t_i+\Delta t)) \quad (7)$$

Like $T_{ref}$, the blade pitch angle $\zeta_{ref}$ is dependent upon the desired value and the rotor speed error. Also $\zeta_{ref}$ is prevented from becoming less than the optimum full power pitch angle defined for region 2 operation. This is accomplished by treating any negative value computed from equation 7 as zero. Thus the wind turbine can be operated efficiently and safely within the structural and electrical limits of the particular wind turbine.

Preferably, the power electronic converter 30 (FIG. 1) includes torque control as fully disclosed in a commonly assigned, copending patent application having Ser. No. 07/649,567, now U.S. Pat. No. 5,083,039, entitled "VARIABLE SPEED WIND TURBINE", filed by R. D. Richardson and W. L. Erdman on Feb. 1, 1991, the specification of which is incorporated by reference herein.

While not as preferable as the torque control disclosed in that application, other means of torque control can be utilized for the purposes of this invention. Such means include, but are not limited, to power electronic control of a wound-field or permanent-magnet synchronous generator, a conventional armature or field-controlled direct current generator, a doubly fed induction generator, and various types of switched-reluctance, variable-reluctance or reluctance-synchronous generators. Also variable speed torque control can, in principle, be accomplished mechanically using a variable ratio transmission, a conventional constant speed induction or synchronous generator and an appropriate torque measurement and servo control means for the variable ratio transmission.

In general, the rotor speed stabilizer 44 provides a means for stable speed control of the wind turbine. For lower wind speeds, stability is not critical and the rotor speed stabilizer 44 may allow the wind turbine to freewheel whenever motoring torque would be required to maintain the speed. In other words, the rotor speed stabilizer 44 does not apply torque to motor the rotor. For higher speeds, well above cut-in, the rotor speed stabilizer 44 assures an arbitrary degree of asymptotic rotor speed stability. In the presence of wind speed disturbances, it provides arbitrarily small rotor speed deviations from the desired value, which tracks the wind speed.

FIG. 7 is a flow chart illustrating the method of the present invention from one perspective. The average wind speed U is predicted at a next time step to provide $U(t_i+\Delta t)$. It may be noted that average wind speed U is indicative of the aerodynamic driving torque that will be supplied by the wind to the generator. Using the predicted wind speed $U(t_i+\Delta t)$, the method includes selecting desired values for rotor speed, $\omega_R^*$, and the load torque, $T_{load}^*$. In accordance with these desired values, the method further includes selecting a command torque $T_{ref}$ to be applied as a load torque to the generator at the next time step $(t_i+\Delta t)$ so that the actual rotor speed will approach the desired rotor speed.

FIG. 8 is another flow chart illustrating a method of operation of the preferred embodiment. The wind speed U and the rotor speed $\omega_R$ are determined before the generator begins power generation. Next, the net torque is estimated, and predictions are made for the wind speed U and the rotor speed $\omega_R$. Based on the predicted wind speed $U(t_i+\Delta t)$, a desired load torque, rotor speed, and blade pitch angle are determined. Then, a reference load torque is calculated with the desired load torque and a correction factor. The generator load is then adjusted to approximate the commanded load torque. Lastly, the predicted values at $(t_i+\Delta t)$ are made the present value of time $(t_i)$ and i is incremented by one.

The invention may be embodied in other specific forms without departing from its spirit or essential characteristics. The described embodiment is to be considered in all respects only as illustrative and not restrictive and the scope of the invention is, therefore, indicated by the appended claims rather than by the foregoing descriptions. All changes which come within the meaning and range of equivalency of the claims are to be embraced within their scope.

APPENDIX A $t_i$ is the current time $\Delta t$ is the length of the time step $U(t_i)$ is the wind speed predicted for the current time step $U(t_i+\Delta t)$ is a prediction of the wind speed for the next time step $f_1(.)$ is an aerodynamically derived function dependent on varying aerodynamic parameters R is the rotor radius $\omega_{Rmeas}(t_i)$ is the measured rotor speed $\omega_R(t_i)$ is the rotor speed predicted for the current time step $\omega_R(t_i+\Delta t)$ is the prediction of the rotor speed at the next time step $T_{net}$ is an estimate of the net torque on the system $T_{load}(t_i)$ is the known controlled load torque $T_{wind}$ is the estimate of the torque supplied by wind power $T_{ref}$ is the commanded torque I is the rotor inertia $K_1, K_2, K_3, K_4$ and $K_5$ are constant gains determined to provide dynamic stability $\pi$ is the air density $\epsilon_R(t_i)$ is the rotor speed error $(\omega_{Rmeas}(t_i)-\omega_R(t_i))$ $\zeta(t_i)$ is the blade pitch angle $\zeta_{ref}$ is the commanded blade pitch angle "*" is a superscript that denotes a value obtained from the parameter schedules

What is claimed is:

1. A controller for a variable speed electrical generator having a rotor driven with a driving torque supplied by a power source that varies over time, said controller comprising:
means for predicting a power parameter indicative of the amount of power that will be available from the varying power source at a subsequent point in time;
means responsive to said predicted power parameter for selecting a desired rotor speed at said subsequent point in time; and
means for selecting a control parameter to be applied to control a rotor speed at said subsequent point in time, said control parameter being selected so that the rotor speed will approximate said desired rotor speed.

2. The variable speed generator controller of claim 1, further comprising means for controlling the rotor speed with the control parameter.

3. The variable speed generator controller of claim 1 wherein said means for selecting a control parameter further comprises means for calculating a reference load torque to be applied to the generator at said subsequent point in time.

4. The variable speed generator controller of claim 3 further comprising means for applying said reference load torque to the generator.

5. The variable speed generator controller of claim 1 wherein said means for predicting said power parameter further comprises means for estimating an amount of driving torque being applied to the rotor.

6. The variable speed generator controller of claim 5 further comprising:
a rotor speed sensor for supplying a sensed rotor speed parameter; and
means for calculating a rotor speed error and applying said rotor speed error to said means for selecting the power parameter.

7. The variable speed generator controller of claim 1 wherein the means for predicting a power parameter further comprises:
means for estimating a net torque being applied to the rotor, including
means for estimating an amount of driving torque being applied to the rotor,
means for estimating an amount of load torque being applied to the rotor, and
means for calculating a difference between the estimated driving torque and the estimated load torque, to provide an estimated net torque.

8. The variable speed generator controller of claim 1 further comprising means for applying said means for predicting a power parameter, said means for selecting a desired rotor speed, and said means for selecting a control parameter selection, to provide a control parameter at each of a series of subsequent points in time.

9. A controller for a variable speed electrical generator in a wind turbine having at least one aerodynamic surface sweeping a swept area that presents a cross-section to a wind which may vary over time, the wind turbine converting the wind energy into a driving torque applied to a generator rotor, said controller comprising:
means for estimating a wind speed over the swept area;
means responsive to the estimated wind speed for selecting a desired rotor speed; and
means for controlling the rotor speed to approximate said desired rotor speed.

10. The variable speed generator controller of claim 9 wherein said means for controlling the rotor speed further comprises means for calculating a reference load torque to be applied to the generator at said subsequent point in time.

11. The variable speed generator controller of claim 10, wherein the means for controlling the rotor speed further comprises means for applying said reference load torque to the generator.

12. The variable speed generator controller of claim 9 wherein said means for predicting said wind speed further comprises means for estimating an amount of driving torque being applied to the rotor.

13. The variable speed generator controller of claim 12 further comprising:
a rotor speed sensor for supplying a sensed rotor speed parameter;
means for calculating a rotor speed error; and
means for applying said rotor speed error to said means for controlling the rotor speed.

14. The variable speed generator controller of claim 9 wherein the means for estimating a wind speed further comprises:
means for estimating a net torque being applied to the rotor, including
means for estimating an amount of driving torque being applied to the rotor,
means for estimating an amount of load torque being applied to the rotor, and
means for calculating a difference between the estimated driving torque and the estimated load torque, to provide an estimated net torque.

15. The variable speed generator controller of claim 9 wherein the aerodynamic surfaces have a pitch that is selectable by a pitch control mechanism, and wherein said means for controlling the rotor speed includes means for controlling said pitch control mechanism.

16. The variable speed generator controller of claim 15 further comprising:
means for calculating a reference pitch angle dependent upon said wind speed; and
means for controlling the pitch control mechanism in order to apply said reference pitch angle.

17. A controller for a variable speed electrical generator in a wind turbine having at least one aerodynamic surface sweeping a swept area that presents a cross-section to a wind that may vary over time, the wind turbine converting the wind energy into a driving torque applied to a generator rotor, said controller comprising:
means for predicting a wind speed over said swept area at a subsequent point in time;
means responsive to the predicted wind speed for selecting a desired rotor speed at said subsequent point in time; and
means for selecting a control parameter to be applied to control a rotor speed at said subsequent point in time, said control parameter being selected so that the rotor speed will approximate said desired rotor speed.

18. The variable speed generator controller of claim 17 wherein said means for selecting a control parameter further comprises a means for calculating a reference load torque to be applied to the generator at said subsequent point in time.

19. The variable speed generator controller of claim 18 further comprising a means for applying said reference load torque to the generator.

20. The variable speed generator controller of claim 17 wherein said means for predicting said wind speed further comprises means for estimating an amount of driving torque being applied to the rotor.

21. The variable speed generator controller of claim 20 further comprising:
   a rotor speed sensor for supplying a sensed rotor speed parameter;
   means for calculating a rotor speed error; and
   means for applying said rotor speed error to said means for selecting a control parameter.

22. The variable speed generator controller of claim 17 wherein the means for predicting a wind speed further comprises:
   means for estimating a net torque being applied to the rotor, including
       means for estimating an amount of driving torque being applied to the rotor,
       means for estimating an amount of load torque being applied to the rotor, and
       means for calculating a difference between the estimated driving torque and the estimated load torque, to provide an estimated net torque.

23. A controller for selecting the load torque on a rotor in a variable speed wind turbine electrical generator, the wind supplying a driving torque to the rotor in a direction opposing the load torque, the amount of the driving torque varying over time with the wind speed, said controller comprising:
   means for predicting the average wind speed at a subsequent point in time;
   means for selecting a desired rotor speed dependent upon the predicted wind speed at said subsequent point in time;
   torque selecting means, responsive to said predicted wind speed and dependent upon said desired rotor speed, for selecting a reference load torque to be applied at said subsequent point in time, said reference load torque being selected so that the rotational speed of said rotor will approximate said desired rotor speed.

24. The controller of claim 23 wherein the means for selecting a desired rotor speed includes a parameter schedule for applying the predicted wind speed to obtain a desired rotor speed.

25. The controller of claim 23 wherein the torque selecting means comprises a parameter schedule for applying the predicted wind speed to obtain a desired load torque.

26. The controller of claim 25 wherein the torque selecting means further includes:
   means for determining a stability correction term; and
   means for adding the desired load torque and the stability correction term to obtain the reference load torque to be applied to the generator.

27. The controller of claim 25 wherein the means for determining a stability correction term comprises a means for predicting a rotor speed at said subsequent point in time and also comprises a means for determining a rotor speed error as a function of the predicted rotor speed and the desired rotor speed.

28. The controller of claim 23 wherein the prediction means includes:
   means for determining a first correction term;
   means for estimating a current wind speed; and
   means for adding the current wind speed estimate to the first correction term to obtain a wind speed prediction.

29. The controller of claim 28 wherein the prediction means includes means for determining a second correction term and further includes means for adding the current wind speed estimate, the first correction term, and the second correction term to obtain a wind speed prediction.

30. The controller of claim 28 wherein the prediction means includes means for determining a driving torque applied to the rotor by the wind power, and the means for determining a first correction term includes means determining a first correction term as a function of the driving torque.

31. The controller of claim 23 wherein the prediction means includes a means for estimating the driving torque supplied by the wind power at the current time step.

32. The controller of claim 31 wherein the prediction means further includes a means for estimating the net torque on the rotor at the current time step.

33. The controller of claim 32 wherein the means for estimating the net torque includes subtracting the applied load torque from the driving torque from the applied load torque.

34. The controller of claim 32 wherein the prediction means includes means for determining a first correction term and a means for estimating a current wind speed, and further includes a means for adding the current wind speed estimate to the first correction term to obtain a wind speed prediction.

35. A wind speed observer for a wind turbine having a rotor driven by a wind applying power to at least one blade, said wind applying a driving torque to the rotor, said wind speed observer predicting an average wind speed over a sweep of the blades, said wind speed observer comprising:
   means for obtaining a parameter indicative of a rotor speed;
   means for estimating the average wind speed at a current time; and
   means for predicting the average wind speed at a subsequent point in time.

36. The wind speed observer of claim 35 further comprising means for estimating the driving torque applied by the wind, said estimating means being responsive to said rotor speed and said estimated wind speed.

37. The wind speed observer of claim 35 further comprising:
   means for estimating a net torque being applied to the rotor, including
       means for estimating an amount of driving torque being applied to the rotor,
       means for estimating an amount of load torque being applied to the rotor, and
       means for calculating a difference between the estimated driving torque and the estimated load torque, to provide an estimated net torque.

38. The wind speed observer of claim 35 further comprising means for applying said means for obtaining a parameter indicative of a rotor speed, said means for estimating the average wind speed, and said means for predicting the average wind speed, to predict the average wind speed at each of a series of subsequent points in time.

39. The wind speed observer of claim 35 further comprising:

means for obtaining a parameter indicative of the pitch angle of the blades; and means for estimating the driving torque applied by the wind speed, said estimating means being responsive to said rotor speed parameter, said estimated wind speed, and said pitch angle parameter.

40. A wind turbine controller for a variable speed wind turbine including a variable speed generator driven by a rotor, said wind turbine having one or more aerodynamic surfaces for converting wind power into a driving torque on the rotor, said controller estimating the wind speed averaged over the sweep of the aerodynamic surfaces, said controller selecting a reference load torque in response to the estimations for the wind speed in order to achieve efficient generator operation, said controller comprising:

means for sensing the rotor speed;

a wind speed observer including
means for estimating the wind speed;

a parameter schedule including values that provide a desired load torque and a desired rotor speed for the wind turbine as a function of wind speed; and a rotor speed stabilizer including means for commanding a reference load torque based on the desired load torque and the desired rotor speed.

41. The wind turbine controller of claim 40 wherein the wind speed observer further comprises:

means for estimating a net torque being applied to the rotor, including said means for estimating an amount of driving torque being applied to the rotor, means for estimating an amount of load torque being applied to the rotor, and means for calculating a difference between the estimated driving torque and the estimated load torque, to provide an estimated net torque.

42. The variable speed generator controller of claim 40 further comprising means for applying said wind speed observer, said parameter schedule, and said rotor speed stabilizer, to provide a reference load torque at each of a series of subsequent points in time separated by the time interval $\Delta t$.

43. The wind turbine controller of claim 40 further comprising:

at least one aerodynamic blade having an adjustable aerodynamic surface angle;

a sensor for sensing the aerodynamic surface angle of the blade;

a blade aerodynamic actuator for controlling the aerodynamic surface angle;

a parameter schedule including values that provide a desired angle of the aerodynamic surface as a function of wind speed; and means for commanding a reference angle of the aerodynamic surface based on the desired angle of the aerodynamic surface and the desired rotor speed.

44. A wind turbine controller for a variable speed wind turbine including a variable speed generator driven by a rotor, said wind turbine having one or more aerodynamic surfaces for converting wind power into a driving torque on the rotor, said controller predicting the wind speed averaged over the sweep of the aerodynamic surfaces, said controller selecting a reference load torque in response to the predictions for the wind speed in order to achieve efficient generator operation, said controller comprising:

means for sensing the rotor speed;

a wind speed observer including means for estimating the driving torque on the rotor at a present time $t_i$, and, means for predicting the wind speed at a subsequent point in time $t_i + \Delta t$;

a parameter schedule including values that provide a desired load torque and a desired rotor speed for the wind turbine as a function of wind speed; and a rotor speed stabilizer including program means for commanding a reference load torque based on the desired load torque and the desired rotor speed.

45. The wind turbine controller of claim 44 wherein the wind speed observer further comprises:

means for estimating a net torque being applied to the rotor, including said means for estimating an amount of driving torque being applied to the rotor, means for estimating an amount of load torque being applied to the rotor, and means for calculating a difference between the estimated driving torque and the estimated load torque, to provide an estimated net torque.

46. The variable speed generator controller of claim 44 further comprising means for applying said wind speed observer, said parameter schedule, and said rotor speed stabilizer, to provide a reference load torque at each of a series of subsequent points in time separated by the time interval $\Delta t$.

47. The wind turbine controller of claim 44 further comprising:

at least one aerodynamic blade having an adjustable pitch angle;

a sensor for sensing the pitch angle of the blade;

a blade pitch actuator for controlling the pitch angle;

a parameter schedule including values that provide a desired blade pitch angle as a function of wind speed; and means for commanding a reference pitch angle based on the desired blade pitch angle and the desired rotor speed.

48. A wind speed sensing method for operating a variable speed wind turbine, said variable speed wind turbine having at least one blade sweeping over a swept area, the blades turning a rotor in a generator, comprising the steps of:

(a) allowing the wind turbine to rotate during operation in low wind when no power is being generated;

(b) monitoring the rotor speed;

(c) obtaining a wind speed estimate of the average wind speed present over the area swept by the blades, said wind speed estimate being based upon said rotor speed; and (d) obtaining a wind speed prediction for a subsequent point in time.

49. The wind speed sensing method of claim 48 further comprising a step (e) repeating steps (a) through (d), to obtain a wind speed prediction at each of a series of subsequent points in time.

50. The wind speed sensing method of claim 48 further comprising a step (d) of monitoring the wind speed estimate over a time interval to obtain a average wind speed over said time interval.

51. The wind speed sensing method of claim 48 further comprising the steps of:

(e) monitoring the average wind speed; and (f) generating power in the generator when a preselected average wind speed has been exceeded.

52. A method for predicting the wind speed averaged over the sweep of the blades of a wind turbine, said method comprising the steps of:
  (a) estimating the present wind speed;
  (b) estimating an amount of driving torque applied to the rotor at the present time;
  (c) calculating a first correction term dependent upon said amount of driving torque estimated for said present time;
  (d) adding the estimated wind speed for the present time to said first correction term to predict the wind speed average for a subsequent point in time; and
  (e) at said subsequent point in time, repeating steps (a)–(d), and in the step (a) applying the wind speed predicted for said subsequent point in time as the wind speed estimate for the present time.

53. The method of claim 52 further comprising a step (f), estimating a net torque being applied to the rotor, including:
  estimating an amount of load torque being applied to the rotor, and
  calculating a difference between the estimated driving torque and the estimated load torque, to provide an estimated net torque;
wherein said step (c) further includes applying said estimated net torque to calculate the first correction term.

54. The method of claim 52 further comprising a step (f), repeating steps (a) through (e), to predict a wind speed average at each of a series of subsequent points in time.

55. A method for controlling the rotor speed of a variable speed wind turbine, said method utilizing a parameter schedule of desired operating parameters indexed by the wind speed, said method comprising the steps of:
  (a) estimating the average wind speed at the present time;
  (b) predicting the average wind speed at a subsequent point in time;
  (c) selecting a desired rotor speed from the schedule of desired operating parameters;
  (d) supplying a control parameter for the wind turbine; and (e) adjusting the rotor speed in accordance with said control parameter, so that the rotor speed approximately follows the wind speed.

56. The method of claim 55 wherein step (b) further comprises:
  estimating an amount of driving torque being applied to the rotor;
  estimating an amount of load torque being applied to the rotor; and
  calculating a difference between the estimated driving torque and the estimated load torque, to provide an estimated net torque.

57. The method of claim 55 further comprising a step (f) of repeating steps (a) through (e), to adjust the wind speed at each of a series of subsequent points in time.

58. A method for supplying a control parameter to control a variable speed electrical generator in a wind turbine having rotor speed control dependent upon said control parameter, the wind turbine having at least one aerodynamic surface sweeping a swept area that presents a cross-section to a wind that may vary over time, the wind turbine converting the wind energy into a driving torque applied to a generator rotor, said method comprising the steps of:
  (a) predicting a wind speed average over the swept area at a subsequent time step;
  (b) applying said wind speed predicted at said subsequent time step to select a desired rotor speed for said subsequent time step; and
  (c) applying said desired rotor speed to select a control parameter that can be applied to said rotor speed control so that said desired rotor speed will be approximated at said subsequent time step.

59. The control method of claim 58 wherein said step (a), predicting a wind speed, further comprises the steps of:
  (d) estimating the wind speed at the present time;
  (e) estimating an amount of driving torque applied to the rotor at the present time;
  (f) calculating a first correction term dependent upon said amount of driving torque estimated for the present time; and
  (g) adding the estimated wind speed for the present time to said first correction term, to predict the wind speed average for the subsequent time step.

60. The control method of claim 59 wherein said step (a), predicting a wind speed, comprises the additional steps of:
  (h) sensing a sensed rotor speed at the present time;
  (i) calculating a rotor speed error at the present time;
  (j) calculating a second correction term based upon said rotor speed error; and
  (k) adding the second correction term to the wind speed predicted in the step (g) to predict the wind speed for said subsequent time step.

61. The control method of claim 58 wherein said step (c), applying said desired rotor speed to select a control parameter, further comprises the step of:
  calculating a reference load torque to be applied to the generator at said subsequent time step.

62. A method for supplying a control parameter to control a variable speed electrical generator in a wind turbine having rotor speed control dependent upon said control parameter, the wind turbine having at least one aerodynamic surface sweeping a swept area that presents a cross-section to a wind that may vary over time, the wind turbine converting the wind energy into a driving torque applied to a generator rotor, said method comprising the steps of:
  (a) estimating a wind speed at the present time;
  (b) estimating a rotor speed at the present time;
  (c) applying said wind speed and said rotor speed to estimate an amount of driving torque applied to the rotor at the present time;
  (d) applying said estimated driving torque to predict a wind speed average over the swept area at a subsequent point in time;
  (e) applying said wind speed predicted at said subsequent point in time to select a desired rotor speed for said subsequent point in time;
  (f) applying said desired rotor speed to select a control parameter that can be applied to said rotor speed control so that said desired rotor speed will be approximated by the actual rotor speed; and
  (g) at said subsequent point in time, repeating steps (a)–(f), applying the wind speed predicted for said subsequent point in time as the wind speed estimate for the present time in the step (a).

63. The control method of claim 62 wherein the method of steps (a)–(g) is continuously repeated at selected time intervals so that the wind speed prediction is updated for each time interval, and the rotor speed is controlled at each time interval to track the wind speed.

64. The control method of claim 62, further comprising the steps of:
   (h) calculating a first correction term dependent upon said amount of driving torque estimated for the present time; and
   (i) adding the estimated wind speed for the present point in time to said first correction term, to predict the wind speed average for said subsequent point in time.

65. The control method of claim 64, further comprising the steps of:
   (j) sensing a sensed rotor speed at the present time;
   (k) calculating a rotor speed error at the present time as the difference between the sensed rotor speed and the predicted rotor speed;
   (l) calculating a second correction term based upon said rotor speed error; and
   (m) adding the second correction term to the wind speed predicted in the step (g), to predict the wind speed for said subsequent point in time.

66. The control method of claim 62 wherein the step (f), applying said desired rotor speed to select a control parameter, further comprises the step of:
   (h) calculating a reference load torque to be applied to the generator at said subsequent point in time.

* * * * *